United States Patent [19]

Ogawa et al.

[11] Patent Number: 5,115,027

[45] Date of Patent: May 19, 1992

[54] POLYPROPYLENE STRETCHED FILM

[75] Inventors: Tadatoshi Ogawa, Grange Height, Singapore; Seiichiro Ima, Ichihara; Kazuki Wakamatsu, Chiba, both of Japan

[73] Assignee: Sumitomo Chemical Company, Limited, Osaka, Japan

[21] Appl. No.: 710,470

[22] Filed: Jun. 5, 1991

Related U.S. Application Data

[63] Continuation of Ser. No. 433,124, Nov. 8, 1989, abandoned.

[30] Foreign Application Priority Data

Nov. 16, 1988 [JP] Japan ................ 63-290920

[51] Int. Cl.⁵ .............. C08L 23/12; C08L 23/14; C08L 53/00; C08J 5/18
[52] U.S. Cl. .................... 525/216; 525/297; 525/88; 525/95
[58] Field of Search .............. 525/216, 297

[56] References Cited

U.S. PATENT DOCUMENTS 4,551,501 11/1985 Shiga et al.
4,603,174 7/1986 Okada et al.
4,748,207 5/1988 Kakugo et al. ............... 525/88

FOREIGN PATENT DOCUMENTS 0227300 7/1987 European Pat. Off.

Primary Examiner—Carman J. Seccuro
Attorney, Agent, or Firm—Stevens, Davis, Miller & Mosher

[57] ABSTRACT

The polypropylene stretched film of the present invention is prepared by stretching a composition comprising a crystalline propylene polymer and 0.1 ppm by weight to 10% by weight of a nucleating agent, the composition having a melting point of 160° C. or more, a crystallization temperature of 128° C. or more and a 20° C. xylene soluble portion of 3.0% by weight or less. The film has a high rigidity and a beautiful appearance as well as the characteristic properties inherent to crystalline propylene polymers. The film can be suitably used for food packaging and textile packaging.

1 Claim, No Drawings

POLYPROPYLENE STRETCHED FILM

This is a continuation of application Ser. No. 07/433,124, filed Nov. 8, 1989, now abandoned.

The present invention relates to a polypropylene stretched film. In more particular, it relates to a polypropylene stretched film having a high rigidity and a beautiful appearance including transparency.

Polypropylene stretched films are good in optical properties, mechanical properties, and suitability for packaging. Hence they have been widely used in the field of packaging including food packaging and textile product packaging. However, the conventional polypropylene stretched films are, for some uses, unsatisfactory in mechanical properties, particularly in rigidity. Therefore, the improvement of such properties has been eagerly desired. Accordingly, there have been proposed a number of proposals for improving the rigidity of polypropylene stretched film. For example, JP-B-47-11656 and 54-15779 propose a method which comprises adding modifiers of petroleum resins such as styrenic hydrocarbon polymers to polypropylenes. JP-A-55-81125 proposes a method which comprises using a polypropylene of which the isotactic pentad fraction of boiling-heptane insoluble portion is 0.955 or more.

Further, JP-A-56-2307, 59-172507 and 62-195007 teach a method for improving the rigidity of polypropylene itself which comprises widening the molecular weight distribution.

For improving the transparency and other appearances of polypropylene stretched films, JP-B-54-15779 discloses a method comprising adding petroleum resins to polypropylene. JP-B-60-43859 and JP-A-60-139428 disclose methods comprising adding a sorbitol derivative or a specific polymeric nucleating agent to polypropylene.

However, these methods disclosed in the above-mentioned documents each have a problem of insufficient improvement in rigidity and transparency, or deterioration of characteristic properties inherent to crystalline propylene polymers, or severe fuming or roll staining during film forming operation.

Thus, in the methods comprising adding modifiers of petroleum resins to polypropylene, although the rigidity and transparency of the product are improved to some extent, the heat resistance and solvent resistance are deteriorated, posing restriction to the use thereof, and moreover severe fuming and roll staining take place during film forming operation. In the method which uses polypropylene having an isotactic pentad fraction of boiling-heptane insoluble portion of 0.955 or more, the rigidity is improved to some extent but it is not yet sufficient, and further the transparency is unsatisfactory. In the method which comprises widening the molecular weight distribution of polypropylene, the rigidity is improved to some extent but it is not sufficient, and moreover, the transparency is very unsatisfactory, either.

In the methods comprising mere addition of sorbitol derivatives or polymeric nucleating agents, no improvement in the rigidity of polypropylene stretched film is recognized although the transparency is improved to some extent.

According to the present invention, there is provided a polypropylene stretched film consisting essentially of a composition which comprises a crystalline propylene polymer and 0.1 ppm by weight to 10% by weight of a nucleating agent, the composition having a melting point of 160° C. or more, a crystallization temperature of 128° C. or more, and a 20° C. xylene soluble portion of 3.0% by weight or less.

When the composition contains a nucleating agent in a content outside the range of from 0.1 ppm by weight to 10% by weight, a melting point of less than 160° C., a crystallization temperature of less than 128° C., or a 20° C. xylene soluble portion of more than 3.0% by weight, the resulting film is unsatisfactory in rigidity or transparency and the merits of the present invention cannot be achieved.

The composition used in the present invention comprising a crystalline propylene polymer and a nucleating agent preferably has a melting point of 164° C. or more, a crystallization temperature of 128° C. or more, and a 20° C. xylene soluble portion of 3.0% by weight or less because such a composition gives a stretched film of enhanced rigidity and transparency. More preferably, it has a melting point of 166° C. or more, a crystallization temperature of 128° C. or more, and a 20° C. xylene soluble portion of 2.5% by weight or less.

The melt flow rate of the composition is not critical. However, it is preferably 10 g/10 min or less, more preferably 1.0-8.0 g/10 min, and most preferably 1.0-6.5 g/10 min.

Although the nucleating agent used in the present invention is not critical, it is preferably a polymer of an α-olefin having 6 or more carbon atoms branched at the 3-position or a copolymer of a vinylcycloalkane, and more preferably a polymer of vinylcyclohexane.

A content of the nucleating agent less than 0.1 ppm by weight is unpreferable since it gives the product an unsatisfactory rigidity and transparency. A content of the nucleating agent exceeding 10% by weight is unpreferable from the viewpoint of processability and cost factor. The content preferably falls in the range of from 2 ppm by weight to 5% by weight, more preferably from 2 ppm by weight to 3% by weight and most preferably from 100 ppm by weight to 3% by weight.

The process for preparing the composition comprising a crystalline propylene polymer and a nucleating agent used in the present invention is not critical so long as the process gives a composition which satisfies the limitations of the present invention. For example, the composition can be prepared by polymerizing a vinyl compound such as vinylcyclohexane with a known Ziegler-Natta catalyst containing a titanium compound, organoaluminum compound and electron donating compound at the first stage and then polymerizing propylene at the second stage. Alternatively, it can be prepared by polymerizing propylene at the first stage, polymerizing a vinyl compound at the second stage, and then polymerizing propylene again at the third stage.

To the composition used in the present invention may be added as occasion demands various additives usually used for polypropylene, such as antioxidants, lubricants, antistatic agents and antiblocking agents.

The polypropylene stretched film of the present invention may be prepared by stretching polypropylene film in at least one direction in a usual manner, for example roll stretching, tenter stretching and tubular stretching. The film is usually stretched 5-100 times that of the original area.

The polypropylene stretched film of the present invention may be subjected to a surface treatment such as corona discharge treatment or flame treatment in a conventional manner.

The polypropylene stretched film of the present invention has a high rigidity and a beautiful appearance, so that it may be used as it is. It may also be used as the base layer of a composite film provided with a heat-sealable layer etc. at least on one side. Such a composite film is particularly suited for packaging.

The present invention will be described further in detail below with reference to Examples, but the scope of the present invention is in no way limited by the Examples.

The characteristic properties of the polypropylene, composition or stretched film mentioned in the Specification and Claims of the present invention are determined by the following methods.

(1) Melt flow rate (MFR)

Determination was made according to JIS K 7210, Condition-14.

(2) Molecular weight distribution ($M_w/M_n$)

Determination was made with gel permeation chromatography (GPC) under the following conditions. The calibration curve was prepared with a standard polystyrene.

Apparatus: Type 150 C. mfd. by Millipore Waters Corp.; column: Shodex M/S800; measuring temperature: 140° C.; solvent: o-dichlorobenzene; sample concentration: 5 mg/8 ml (3) Melting point ($T_m$) and crystallization temperature ($T_c$)

Determination was made with a differential scanning calorimater (DSC, mfd. by Perkin-Elmer Inc.). A specimen weighing 10 mg was molten in nitrogen atmosphere at 220° C. for 5 minutes, and then the temperature was lowered down to 40° C. at a rate of 5° C./min to obtain a crystallization heat-evolution curve. The temperature of the maximum peak of the curve was taken as the crystallization temperature. Thereafter, the temperature was raised at a rate of 5° C./min to obtain a melting heat-adsorption curve. The temperature of the maximum peak of the curve was taken as the melting point.

(4) 20° C. Xylene soluble portion (CXS)

One gram of polypropylene was dissolved completely in 100 ml of boiling xylene, and the solution was then brought to 20° C. and allowed to stand for 4 hours. Thereafter, the formed precipitate was separated by filtration from the solution. The filtrate was evaporated to dryness and further dried under reduced pressure at 70° C. The dried product was weighed to determine the content of the xylene soluble portion (% by weight).

(5) Scattering-transmitted light intensity (LSI)

Determination was made with an LSI Tester (mfd. by Toyo Seiki, Inc.) by receiving scattering-transmitted light in the range of 1.2°–3.6°. Since the LSI value corresponded quite well to the visually-observed, see-through clarity in the case of polypropylene stretched film, it was taken as the measure of transparency.

(6) Young's modulus

A test piece 20 mm in width was taken along the longitudinal direction (MD) and stretched with a tensile tester at a distance between grips of 60 mm and a stretching velocity of 5 mm/min to obtain an S-S curve, from which the initial modulus of elasticity was determined.

EXAMPLE 1

(1) Preparation of solid catalyst (i) Synthesis of solid product

The inner atmosphere of a flask of 5-l inner volume fitted with a stirrer and dropping funnel was replaced by argon. Then, 1,100 ml of n-heptane and 670 ml of tetra-n-butoxytitanium were put into the flask, and the temperature in the flask was kept at 35° C. A solution consisting of 1,080 ml of n-heptane and 445 ml of ethylaluminum sesquichloride was gradually introduced by drops into the flask from the dropping funnel over a period of 2 hours while the temperature in the flask was kept at 35° C. After completion of the dropwise introduction, the temperature was raised to 60° C. and the reaction mixture was stirred for one hour. The mixture was allowed to stand at room temperature and separated into solid and liquid. The solid was washed 4 times repeatedly with 1,000 ml of n-heptane and dried under reduced pressure to obtain a reddish brown solid product. The solid product contained 5.2 mmol of titanium and 7.0 mmol of the n-butoxy group per gram of the solid product.

(ii) Synthesis of solid catalyst component

The inner atmosphere of a flask of 1-l inner volume was replaced by argon. Then, 54 g of the solid product prepared in the above item (i) and 270 ml of n-heptane were put into the flask and the temperature in the flask was kept at 65° C. Then, 48 ml of di-n-butyl ether and 156 ml of titanium tetrachloride were added thereto. The resultant mixture was allowed to react at 65° C. for one hour. Then, the reaction mixture was allowed to stand at room temperature and separated into solid and liquid. The solid thus obtained was washed 4 times repeatedly with 500 ml of n-heptane and dried under reduced pressure to obtain a solid catalyst component (hereinafter the solid catalyst component (a)). Subsequently, 600 ml of dehydrated and purified n-heptane, 16.5 mmol of diethylaluminum chloride and 50 g of the solid catalyst component (a) prepared above were put in succession into a 1-l glass flask. The resulting mixture was adjusted to a temperature of 60° C. Then, propylene was fed into the flask to keep a pressure of 200 mmHg over atmospheric pressure and polymerization was thus carried out until the amount of fed propylene reached 40 g. Succeedingly, 170 ml of vinylcyclohexane was fed over a period of one hour and polymerization was continued for further two hours. The solid catalyst containing polymers of propylene and vinylcyclohexane thus obtained was washed with 200 ml of dehydrated and purified n-heptane. Then, the solid catalyst was dried to obtain 222 g of a solid catalyst containing 40 g of propylene polymerization units and 132 g of vinylcyclohexane polymerization units (hereinafter the solid catalyst (b)).

(2) Preparation of Composition

Into a 0.33-m³ stainless steel (SUS) reactor fitted with a stirrer which had been adjusted with propylene to a gauge pressure of 0.5 kg/cm² and kept at 35° C. were introduced 0.16 m³ of n-heptane, 1.2 mol of diethylaluminum chloride and 0.1 mol of methyl methacrylate in succession, and then 150 g of the solid catalyst (b) prepared above, 20 kg of propylene and 75 l of hydrogen. The temperature was then raised to 60° C. and polymerization was initiated. The polymerization was continued by feeding propylene to keep a polymerization pressure of 6 kg/cm² gauge and feeding hydrogen to keep a hydrogen concentration in gas phase of 6% by volume and was finished when the total amount of fed propylene reached 28 kg.

The resulting polymerization slurry was immediately introduced into an after-treatment vessel, polymerization was terminated with butanol. After having been treated at 60° C. for 3 hours, the resulting slurry was washed with water. Separating the solid from liquid gave 8.5 kg of a polymer mixture.

The content of vinylcyclohexane polymer in the polymer mixture was 10,500 ppm (1.05% by weight).

To 100 parts by weight of the polymer mixture obtained above were added 0.1 part by weight of calcium stearate, 0.2 part by weight of Sumilizer® BHT and 0.05 part by weight of Irganox® 1010, and mixed with a Henschel mixer to obtain a composition. The composition was melt-extruded to obtain pellets.

The pellets showed a melt flow rate of 6.5 g/10 min., a melting point of 167° C., a crystallization temperature of 135° C., and a CXS of 2.1% by weight.

The pellets were melt-extruded through a sheet extruder having a screw part diameter of 40 mm at a die temperature of 280° C. Then, the extruded sheet was cooled with a cooling roll at 30° C. to obtain a sheet 0.5 mm in thickness.

The sheet obtained above was stretched 5-folds in the longitudinal direction (MD) and 5-folds in the transversal direction (TD) with a bench-type biaxial stretching apparatus at a stretching temperature of 150° C. to obtain a biaxially stretched film of about 20 μm thickness. Table 1 shows the results of the determination of the transparency and rigidity of the film obtained.

COMPARATIVE EXAMPLE 1

A film was prepared and evaluated in the same manner as in Example 1 except that a crystalline propylene polymer of a melt flow rate of 2.3 g/10 min (Sumitomo Noblen FS2011A) was used alone in place of the composition used in Example 1.

The results of evaluation are shown in Table 1.

EXAMPLE 2

A polymer mixture having a vinylcyclohexane polymer concentration of 2,050 ppm by weight was prepared in the same manner as in Example 1 by using the solid catalyst (b) of Example 1 but for replacing diethylaluminum chloride by (OBu)$_{0.3}$Al(C$_2$H$_5$)$_2$Cl$_{0.7}$, methyl methacrylate by methyl toluylate, and changing the hydrogen concentration and the propylene feed amount. A film was prepared in the same manner as in Example 1 except that a composition comprising the polymer mixture prepared above was used. The film thus obtained was evaluated in the same manner as in Example 1. Table 1 shows the results of the evaluation.

EXAMPLE 3

The same procedures as in Example 1 was repeated except that the composition of Example 2 was additionally incorporated with 0.001 PHR of 2,5-dimethyl-2,5-di(tert-butylperoxy)hexane in pelletizing. The pellets obtained showed a melt flow rate of 4.2 g/10 min and M$_w$/M$_n$ of 4.9. A film was prepared in the same manner as in Example 1 except that these pellets were used. The film thus obtained was evaluated in the same manner as in Example 1. Table 1 shows the results of the evaluation.

The film thus obtained had a higher transparency than that in Example 2.

EXAMPLE 4

A film was prepared in the same manner as in Example 1 except that the propylene feed amount was altered and the vinylcyclohexane polymer concentration was changed. The film thus obtained was evaluated in the same manner as in Example 1. Table 1 shows the results of the evaluation.

EXAMPLE 5

A polymer mixture having a vinylcyclohexane polymer concentration of 23,400 ppm by weight and ethylene content of 0.7% by weight was prepared in the same manner as in Example 1 using the solid catalyst (b) of Example 1 except that the hydrogen concentration was altered and a gas mixture of propylene with a small amount of ethylene was fed.

The film was prepared in the same manner as in Example 1 except that a composition comprising the polymer mixture prepared above was used. The film thus obtained was evaluated in the same manner as in Example 1. Table 1 shows the results of the evaluation.

COMPARATIVE EXAMPLE 2

Propylene was polymerized in the same manner as in the preparation of the polymer mixture in Example 1 except that the solid catalyst (a) of Example 1 was used, the polymerization temperature was altered to 55° C. and the hydrogen concentration was changed. The polymer obtained had an isotactic pentad fraction of boiling heptane insoluble portion of 0.973 and a content of boiling heptane soluble portion of 4.9% by weight as determined by the method described in JP-A-55-81125.

A film was prepared by using the polymer obtained above in the same manner as in Example 1 and the film was evaluated in the same manner as in Example 1. The results of evaluation are shown in Table 1.

COMPARATIVE EXAMPLE 3

A film was prepared in the same manner as in Example 1 except for using a composition which consists of 100 parts by weight of the crystalline propylene polymer of Comparative Example 1 and 0.25 part by weight of the polymer mixture of Example 1. The film thus obtained was evaluated in the same manner as in Example 1. The results of evaluation are shown in Table 1.

COMPARATIVE EXAMPLE 4 AND EXAMPLE 6

A crystalline propylene polymer having a melt flow rate of 1.0 g/10 min was obtained by polymerizing propylene in the same manner as in Example 2 except for using the solid catalyst (a) of Example 1 (Comparative Example 4). Then, a polymer mixture was obtained by adding 0.3 part by weight of the polymer mixture of Example 4 to 100 parts by weight of the crystalline propylene polymer obtained above (Example 6). Films were prepared in the same manner as in Example 1 by using the above propylene polymer alone or the polymer mixture obtained above. The films were evaluated in the same manner as in Example 1. Table 1 shows the results of the evaluation.

COMPARATIVE EXAMPLE 5

A polymer mixture was obtained by adding to the polymer mixture of Example 1 2.5% by weight of the cold xylene solubles extracted from the crystalline propylene polymer of Comparative Example 1. To 100 parts by weight of the polymer mixture were added 0.1 part by weight of calcium stearate, 0.2 part by weight of Sumilizer ® BHT and 0.05 part by weight of Irganox ® 1010. Then, the resulting mixture was melt-blended with a roll blender at 200° C. to obtain a composition. The composition was melt-formed with a hot press at 230° C. and cooled at 30° C. to obtain a pressed sheet of 0.5 mm thickness. The sheet was stretched in the same manner as in Example 1 and the resulting film was evaluated. The results of evaluation are shown in Table 1.

same manner as in Example 1. Table 1 shows the results of the evaluation.

Thus, a polypropylene stretched film according to the present invention having a high regidity and a beautiful appearance including transparency can be obtained without impairing the characteristic properties inherent to crystalline propylene polymers by stretching a composition comprising a specified crystalline propylene polymer and a specified nucleating agent in a specified ratio.

TABLE 1

| Example No. | Composition (including compositions containing a crystalline propylene polymer alone) | | | | | | Properties of film | |
|---|---|---|---|---|---|---|---|---|
| | MFR g/10 min | Nucleating agent | | $T_m$ (°C.) | $T_c$ (°C.) | CXS (wt %) | LSI (%) | Young's modulus (MD) (kg/cm²) |
| | | Type | Content (wt ppm) | | | | | |
| Example 1 | 6.5 | Vinylcyclohexane polymer | 10,500 | 167 | 135 | 2.1 | 1.1 | 28,500 |
| Example 2 | 1.3 | Vinylcyclohexane polymer | 2,050 | 169 | 133 | 1.3 | 2.5 | 29,000 |
| Example 3 | 4.2 | Vinylcyclohexane polymer | 2,050 | 169 | 133 | 1.4 | 1.4 | 28,700 |
| Example 4 | 6.1 | Vinylcyclohexane polymer | 890 | 166 | 133 | 1.8 | 2.1 | 26,400 |
| Example 5 | 2.5 | Vinylcyclohexane polymer | 23,400 | 164 | 132 | 2.5 | 1.2 | 26,000 |
| Example 6 | 1.0 | Vinylcyclohexane polymer | 2.7 | 168 | 128 | 1.6 | 3.2 | 26,200 |
| Comparative Example 1 | 2.3 | — | — | 161 | 117 | 3.2 | 11.3 | 22,500 |
| Comparative Example 2 | 1.5 | — | — | 165 | 120 | 1.0 | 8.5 | 24,900 |
| Comparative Example 3 | 2.3 | Vinylcyclohexane polymer | 26 | 163 | 127 | 3.2 | 3.5 | 22,800 |
| Comparative Example 4 | 1.0 | — | — | 167 | 125 | 1.6 | 15.1 | 24,700 |
| Comparative Example 5 | 9.1 | Vinylcyclohexane polymer | 10,200 | 166 | 135 | 4.6 | 2.2 | 24,100 |
| Comparative Example 6 | 4.0 | — | — | 159 | 112 | — | 6.8 | 25,000 |

COMPARATIVE EXAMPLE 6

A film was prepared in the same manner as in Example 1 except for using a polymer mixture of the crystalline propylene polymer of Comparative Example 1 and 10% by weight of Arcon ® P-115 (an alicyclic petroleum resin) in place of the polymer mixture used in Example 1. The film thus obtained was evaluated in the

What is claimed is:

1. A polypropylene stretched film consisting essentially of a composition which comprises a crystalline propylene polymer and 1,05% ppm by weight to 10% by weight of a polymer of vinylcyclohexane, the composition having a melting point of 164° C. or more, a crystallization temperature of 128° C. or more and a 20° C. xylene soluble portion of 2.5% by weight or less.

* * * * *